United States Patent Office 3,029,279
Patented Apr. 10, 1962

3,029,279
PROCESS FOR PRODUCING BETA-MERCAPTO-PROPIONIC ACID
Masahiro Kondo, 160 4-chome, Naruo-cho, Nishinomiya City, Hyogo Prefecture, Japan
No Drawing. Filed Oct. 14, 1957, Ser. No. 689,765
Claims priority, application Japan Feb. 6, 1957
1 Claim. (Cl. 260—526)

This invention relates to processes for producing directly from acrylonitrile the beta-mercaptopropionic-acid-forming material, 2-(2-carboxyethyl) pseudothiourea or beta-isothioureidopropionic acid.

The ordinary methods hitherto known for preparing beta-mercaptopropionic acid are either poor in yield or complicated in processing or expensive in materials. Namely, the yield is very poor when beta-halogenopropionic acid is reacted with sodium hydrosulfide; Acrylonitrile produces no more than 60 percent of beta-mercaptopropionic acid when reacted with sodium polysulfide, and the resulting dithiodipropionitrile is to be hydrolyzed and put to reduction, necessitating many complicated processes; Propiolacton is expensive, although the yield is fairly good, and so is the case with thioacetic acid employed with acrylonitrile, although the resulting 2-cyanoethyl thiolacetate is readily hydrolyzed.

In contrast to these methods, the present invention is based upon the discovery that the reaction mixture of thiourea and acrylonitrile produces 2-(2-carboxyethyl) pseudothiourea or beta-isothioureidopropionic acid in the presence of concentrated hydrochloric acid, and a moderate yield is obtained when the said thiourea and acrylonitrile are reacted with each other at the molar ratio of slightly more than 1.0 to 1.0 in the presence of at least 1.6 mols of the aforesaid acid and heated to 115 deg. C. at the highest. Said product produces, when neutralized, 2-(2-carboxyethyl) pseudothiourea in the form of a fine crystal. In order to obtain beta-mercaptopropionic acid, either said isolated substance or the original reaction mixture is alkalized in an aqueous solution of caustic alkali such as sodium hydroxide or potassium hydroxide, while keeping the temperature of the mixture below 30 deg. C. as higher temperatures reduce the amount of the yield, and the alkalized mixture is heated to boiling. Stirring is employed throughout the entire processes of alkalizing and heating the mixture. After 40 minutes or thereabout, the 2-(2-carboxyethyl) pseudothiourea contained in the mixture is completely hydrolyzed, and the resulting alkali salt of beta-mercaptopropionic acid is acidified. The acidified solution is then extracted with an organic solvent such as ether. The solvent layer is dried and the solvent is expelled, and the residue is finally distilled in vacuo to obtain beta-mercaptopropionic acid.

Any isothiuronium compound is almost impossible to yield in case the mixture of thiourea and acrylonitrile is either alkaline or neutral or weak acid. But the yield increases with the increase in the hydrogen chloride added to the mixture, and acrylonitrile is changed in a good yield to 2-(2-carboxyethyl) pseudothiourea when hydrogen chloride is increased to at least 1.6 mols. And the yield of beta-mercaptopropionic acid is proportionate to the yield of 2-(2-carboxyethyl) pseudothiourea, and the best yield of said 2-(2-carboxyethyl) pseudothiourea is obtained with practically quantitative processing when thiourea is employed slightly in excess to 1.0 mol of acrylonitrile in a concentrated hydrochloric acid medium containing 2.2 to 2.4 mols of hydrogen chloride. In the following table is illustrated the final yield of beta-mercaptopropionic acid which is obtained from the isothiouronium compound in accordance with the principles of this invention.

| Acrylonitrile, mols | Thiourea, mols | Hydrogen Chloride, mols | Beta-mercaptopropionic Acid Found in the Final Reaction Solution, grams |
|---|---|---|---|
| 1.0 | 1.0 | 2.3 | 88.3 |
| 1.0 | 1.0 | 2.1 | 78.9 |
| 1.0 | 1.0 | 1.7 | 59.1 |
| 1.0 | 1.0 | 1.4 | 23.2 |
| 1.0 | 1.1 | 2.3 | 105.8 |
| 1.0 | 1.1 | 2.1 | 98.4 |
| 1.0 | 1.1 | 1.8 | 83.2 |
| 1.0 | 1.1 | 1.6 | 64.2 |

Needless to say, 2-(2-carboxyethyl) pseudothiourea is obtainable when acrylic acid is reacted with thiourea in the presence of hydrochloric acid. But acrylic acid is so unstable that it is hard to preserve, and the yield of acrylic acid obtained by the hydrolysis of acrylonitrile is as poor as 65 percent, because acrylic acid easily polymerizes. It is therefore unprofitable from the industrial point of view to use acrylic acid for the production of beta-mercaptopropionic acid.

The following example will serve to further illustrate the nature of the present invention, but the invention is not restricted thereto.

*Example*

167 grams (2.2 mols) of thiourea is mixed with 440 cc. of concentrated hydrochloric acid containing 4.4 mols of HCl in a four-necked vessel provided with a reflux condenser, stirrer, thermometer and dropping funnel, and the mixture is stirred and heated to about 70 deg. C. To this mixture is added dropwise 106 grams (2.0 mol) of acrylonitrile through the dropping funnel. Then the temperature of the reaction mixture rises to around 90 deg. C. as a result of the exothermic reaction, but the mixture is further heated to 100 to 115 deg. C. and stirred for about 30 minutes. Upon the completion of the reaction, the heated solution is cooled, and 500 grams of 40 percent caustic soda is slowly added thereto with stirring, while keeping the temperature below 30 deg. C. The whole is then heated again with stirring to boiling for about 40 minutes to yield a sodium salt of beta-mercaptopropionic acid, and the solution containing said salt is allowed to slowly flow into 500 cc. of concentrated hydrochloric acid. The analysis of the solution shows that around 210 grams of beta-mercaptopropionic acid is contained therein, and that the yield is almost quantitative. Ether is then added to the solution. After stirring, the ether layer containing said acid is dried with anhydrous sodium sulfate, and the ether is expelled. The residue is then distilled in vacuo at 10 mm. Hg. The fraction between 105 to 115 deg. C. is collected. The minimum yield is 170 grams of around 95 percent purity.

In the above example, the hydrolyzed solution, after being acidified with hydrochloric acid, may be extracted with aliphatic ester such as butyl acetate. When aqueous solution of ammonium hydroxide is added to the resulting butyl acetate layer and the mixture is stirred, an aqueous solution of ammonium salt of beta-mercaptopropionic acid is easily obtained.

Although the applicant has hereinbefore described specific embodiments of the present invention, the applicant does not intend to limit himself solely thereto, but to include all of the obvious variations and modifications within the spirit and scope of the invention.

What I claim is:

A process for producing 2-(2-carboxyethyl) pseudothiourea comprising reacting from at least 1.0 to about 1.1 mol of thiourea with 1 mol of acrylonitrile at a temperature of 70° to 115° C. in a concentrated hydrochloric acid medium containing 1.6 to 2.3 mols of hydrogen chloride.

References Cited in the file of this patent

UNITED STATES PATENTS

| | | |
|---|---|---|
| 2,413,917 | Harman | Jan. 7, 1947 |
| 2,424,007 | Moore et al. | July 15, 1947 |
| 2,545,876 | Clemence et al. | Mar. 20, 1951 |
| 2,569,984 | Fetterly | Oct. 2, 1951 |

OTHER REFERENCES

Riddle: Monomeric Acrylic Esters, p. 152 (1954).